United States Patent [19]

Kozaki et al.

[11] Patent Number: 5,004,264
[45] Date of Patent: Apr. 2, 1991

[54] POSITION CONTROL DEVICE AND AUTOMOTIVE SUSPENSION SYSTEM EMPLOYING SAME

[75] Inventors: Tetsuji Kozaki; Hiroshi Ishikawa; Hideaki Yasui; Mamoru Shimamoto, all of Nagoya; Katsuhiko Hibino, Toyoake; Motoshi Suzuki, Nagoya, all of Japan

[73] Assignee: Nippondenso Co., Ltd., Kariya, Japan

[21] Appl. No.: 386,041

[22] Filed: Jul. 27, 1989

[30] Foreign Application Priority Data

Jul. 29, 1988 [JP] Japan .............................. 63-191936
Aug. 18, 1988 [JP] Japan .............................. 63-204933

[51] Int. Cl.$^5$ ...................... B60G 11/32; B60G 17/00
[52] U.S. Cl. .................................. 280/707; 188/299; 280/709; 364/424.01
[58] Field of Search ................. 280/707, 708, 6.1, 840, 280/714, 709, DIG. 1; 188/299; 364/424

[56] References Cited

U.S. PATENT DOCUMENTS

| | | | |
|---|---|---|---|
| 4,616,848 | 10/1986 | Sugasawa et al. | 280/707 |
| 4,621,833 | 11/1986 | Soltis | 280/707 |
| 4,712,807 | 12/1987 | Kurosawa | 280/707 |
| 4,829,436 | 5/1989 | Kowalik et al. | 280/707 |
| 4,861,066 | 8/1989 | Dernie | 280/707 |

FOREIGN PATENT DOCUMENTS

58-106403 6/1983 Japan .
59-164406 9/1984 Japan .
60-77802 5/1985 Japan .
61-64514 4/1986 Japan .
61-146612 7/1986 Japan .
61-282602 12/1986 Japan .
63-118601 5/1988 Japan .
63-263121 10/1988 Japan .

*Primary Examiner*—Richard A. Bertsch
*Attorney, Agent, or Firm*—Cushman, Darby & Cushman

[57] ABSTRACT

A position control device includes a fluid-operated directional control valve for controlling the position of the piston of a cylinder assembly under fluid pressure in response to a control signal from an electronic controller. The position of the piston is predicted based on the control signal. A position detector detects when the piston has actually reached a predetermined position. When it is detected that the piston has actually reached the predetermined position, the predicted position of the piston is corrected. The electronic controller applies a control signal to the directional control valve so that the predicted position as corrected will be equalized to a target position for the piston. The predetermined position is a substantially intermediate position of the stroke of the piston. The directional control valve comprises a solenoid-controlled valve for controlling the flow rate of the fluid depending on the magnitude of a current supplied to the solenoid-operated valve. The position of the piston is calculated based on the magnitude of the current and a period of time during which the current is supplied to the solenoid-operated valve. An automotive suspension system incorporating the position control device is also disclosed.

16 Claims, 10 Drawing Sheets

POSITION CONTROL DEVICE AND AUTOMOTIVE SUSPENSION SYSTEM EMPLOYING SAME

BACKGROUND OF THE INVENTION

1. Field of the Invention

The present invention relates to a position control device such as a cylinder stroke control device for controlling the stroke of the piston of a cylinder assembly, and an automotive suspension system employing such a position control device.

2. Prior art

Known automotive suspension systems employ a hydraulically operated cylinder assembly incorporated in an automobile stabilizer as disclosed in Japanese Laid-Open Patent Publication No. 61-146612, for example. When an automobile makes a turn, it is subjected to a rotating motion called "roll" about its longitudinal axis. The disclosed system eliminates the roll of the automobile by calculating a target value for the hydraulic cylinder and controlling the position of the piston in the cylinder of the cylinder assembly.

The position of the piston is detected by a potentiometer. One of the fixed and movable ends of the potentiometer is affixed to one end of the stabilizer, whereas the other potentiometer end is secured to an unsprung element. The potentiometer produces an electric signal indicative of the position of the piston in the cylinder.

According to the known suspension system, a target value for the position of the piston is calculated depending on running conditions of the automobile, and a signal representative of the difference between the target piston position and the present piston position as detected by the potentiometer is utilized for feedback control. Since the position of the piston is controlled under fluid pressure such as oil pressure, however, there is a certain response delay before the cylinder assembly is actually actuated after a control command signal is applied. Furthermore, the feedback control process requires an additional time for calculations or the like before the cylinder assembly is actually operated. Because of these time lags or delays, the driver and/or passenger or passengers of the automobile tend to feel uneasy with the attitude behavior of the automobile.

The potentiometer, which is separate from the cylinder assembly, is coupled between the stabilizer and the unsprung element. This arrangement however makes the entire suspension system relatively complex. The potentiometer itself is also complex and expensive.

SUMMARY OF THE INVENTION

In view of the aforesaid drawbacks of the conventional position control device, it is an object of the present invention to provide a position control device including a sensor of simple construction for detecting when a movable member has reached a predetermined position, the position control device being capable of bringing the movable member accurately and quickly to a target position based on a signal generated by such a sensor.

Another object of the present invention is to provide an automotive suspension system which employs such a position control device.

According to the present invention, there is provided a position control device comprising adjusting means for adjusting the position of a movable member in response to a control signal, predicting means for predicting the position of the movable member based on the control signal, position detecting means for detecting when the movable member has actually reached a predetermined position, correcting means for correcting the predicted position of the movable member into the predetermined position when it is detected that the movable member has actually reached the predetermined position, and control means for applying the control signal to the adjusting means so that the predicted position as corrected by the correcting means will be equalized to a target position for the movable member. The movable member comprises a piston of a fluid-operated cylinder assembly.

According to the present invention, there is also provided an automotive suspension system comprising a cylinder assembly disposed between the body of an automobile and a road wheel thereof and having a piston positionally controllable by a fluid under pressure, condition detecting means for detecting a condition of the automobile, processing means for calculating a target position of the piston based on the detected condition of the automobile and position control means for controlling the cylinder assembly so that the position of the piston will be equalized to the target position. The position control means comprises adjusting means for adjusting the position of the piston under the pressure of the fluid in response to a control signal, predicting means for predicting the position of the piston based on the control signal, position detecting means for detecting when the piston has actually reached a predetermined position, correcting means for correcting the predicted position of the piston into the predetermined position when it is detected that the piston has actually reached the predetermined position, and control means for applying the control signal to the adjusting means so that the predicted position as corrected by the correcting means will be equalized to a target position for the piston.

The above and other objects, features and advantages of the present invention will become more apparent from the following description when taken in conjunction with the accompanying drawings in which a preferred embodiment of the present invention is shown by way of illustrative example.

DETAILED DESCRIPTION

Figure 1:
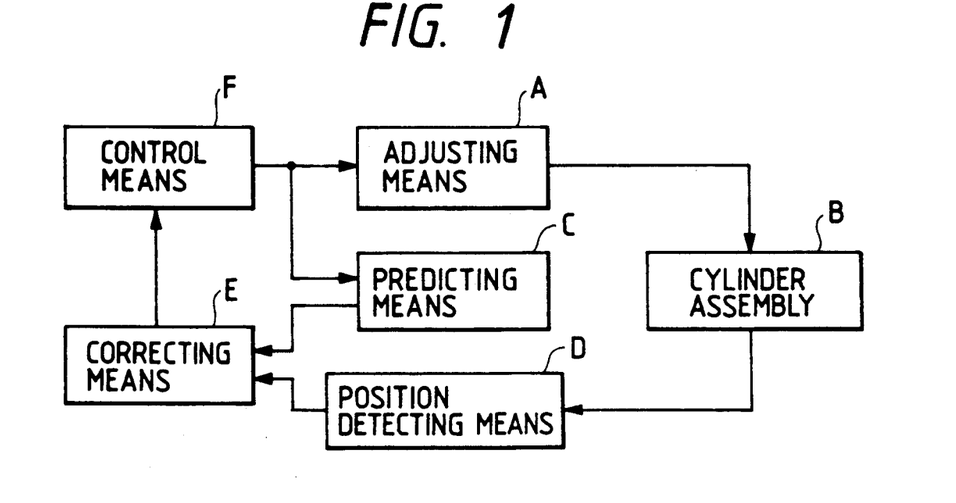
FIG. 1 is a block diagram of a position control device according to the present invention.

FIG. 1 schematically shows a position control device according to the present invention. The position control device includes an adjusting means A for adjusting the position of a movable member B in response to a control signal, a predicting means C for predicting the position of the movable member B based on the control signal, a position detecting means D for detecting when the movable member B has actually reached a predetermined position, a correcting means E for correcting the predicted position of the movable member B into the predetermined position when it is detected that the movable member B has actually reached the predetermined position, and a control means F for applying a control signal to the adjusting means A so that the predicted position as corrected by the correcting means E will be equalized to a target position for the movable member B.

Figure 2:
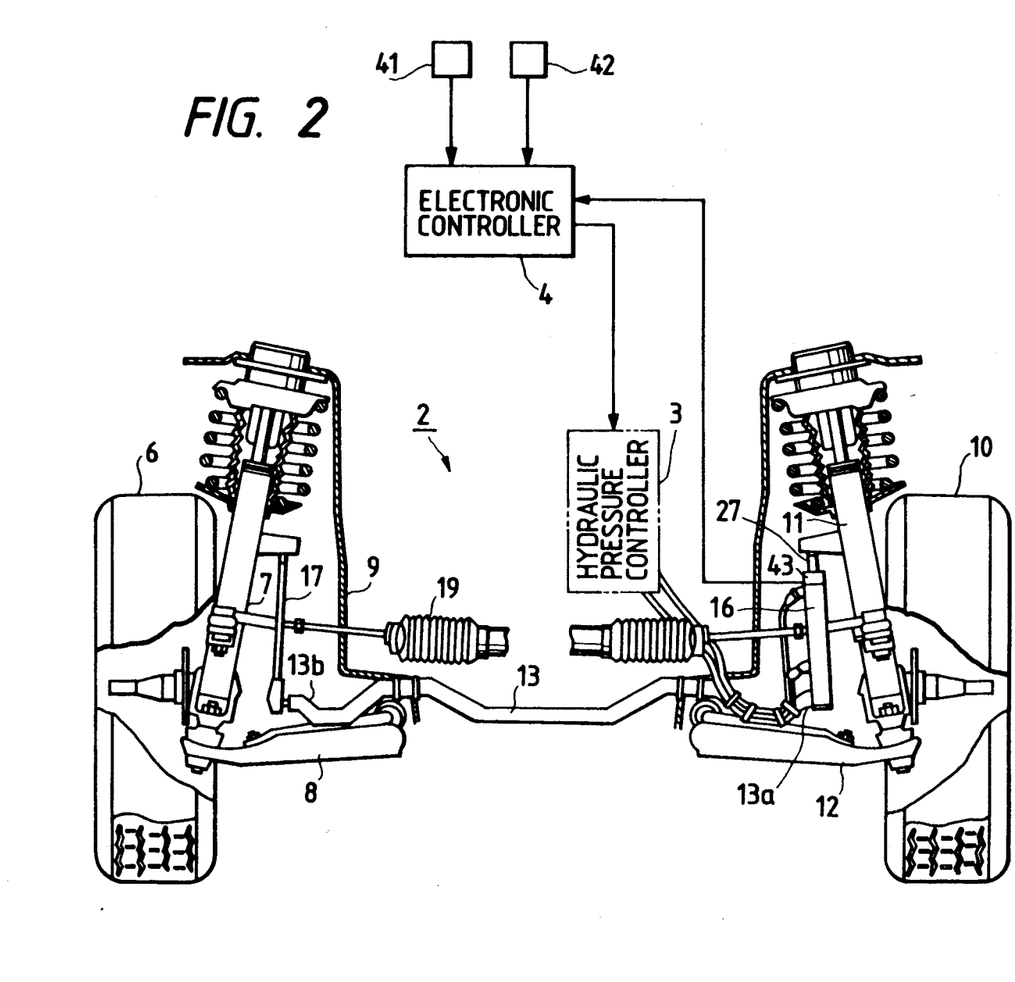
FIG. 2 is a front elevational view, partly in cross section, of an automotive suspension system including a cylinder assembly which is combined with a cylinder stroke control device as the position control device.

FIG. 2 shows an automotive suspension system incorporating a cylinder assembly 16 which is combined with a cylinder stroke control device as the position control device according to the present invention.

The automotive suspension system has a front wheel stabilizer 2 including the cylinder assembly 16, a hydraulic pressure controller 3, and an electronic controller 4 for controlling the hydraulic pressure controller 3.

Two front wheels 6, 10 are rotatably supported on an automotive body 9 by means of respective shock absorbers 7, 11 and respective suspension arms 8, 12. The stabilizer 2 includes a front wheel stabilizer bar 13 which has torsional portions rotatably supported on the automotive body 9 by mean of bearings fixed to the automotive body 9 by bolts or the like. The front wheel stabilizer bar 13 has one end 13a coupled to an unsprung portion of the one of the shock absorbers 11 through the cylinder assembly 16 which can adjust the distance between the end 13a and the coupled portion of the shock absorber 11. The other end 13b of the front wheel stabilizer 13 is connected to an unsprung portion of the other shock absorber 7 through a link rod 17. The front wheels 6, 10 can be turned or steered in response to operation of a steering wheel (not shown).

The electronic controller 4 generates a control signal and applies it to the hydraulic pressure controller 3 in response to a detected signal from an automobile speed sensor 41 which detects the speed of travel of the automobile, a detected signal from a steered angle sensor 42 which detects the steered angle of the steering wheel, and a detected signal from a position detector 43 which detects when the piston of the cylinder assembly 16 has reached a predetermined position.

The cylinder assembly 16 will be described in detail with reference to FIG. 3. The cylinder assembly 16 includes a cylinder 21 in which there is slidably disposed a piston 22 that divides the interior space of the cylinder 21 into upper and lower chambers 25, 26. Oil under pressure can be supplied into and discharged from the upper and lower chambers 25, 26 through upper and lower ports 23, 24, respectively, opening into the cylinder 21 at its upper and lower ends, respectively. The piston 22 is fixedly mounted on the lower end of a piston rod 27 which coaxially extends in the cylinder 21 and has its upper end projecting out of the cylinder 21. The position detector 43 for detecting the position of the piston 22 is disposed in an upper portion of the cylinder 21 above the upper port 23.

The piston rod 27 comprises a first nonmagnetic rod member 272 made of SUS 304, for example, having a first magnetic permeability, and a first magnetic rod member 271 made of S10C, for example, having a second magnetic permeability different from the first magnetic permeability. The members 272, 271 are joined end to end with each other by friction welding, for example. The boundary 273 between these rod members 272, 271 is located at an intermediate position of the full stroke of the piston 22 (i.e., the interval over which the piston 22 is movable) when the piston rod 27 is placed in the cylinder assembly 16.

When the cylinder assembly 16 is expanded or contracted, the twist of the front wheel stabilizer 13 varies and so does the reactive force developed therein in response to the twist, so that the apparent torsional rigidity of the front wheel stabilizer 13 varies.

Figure 6:
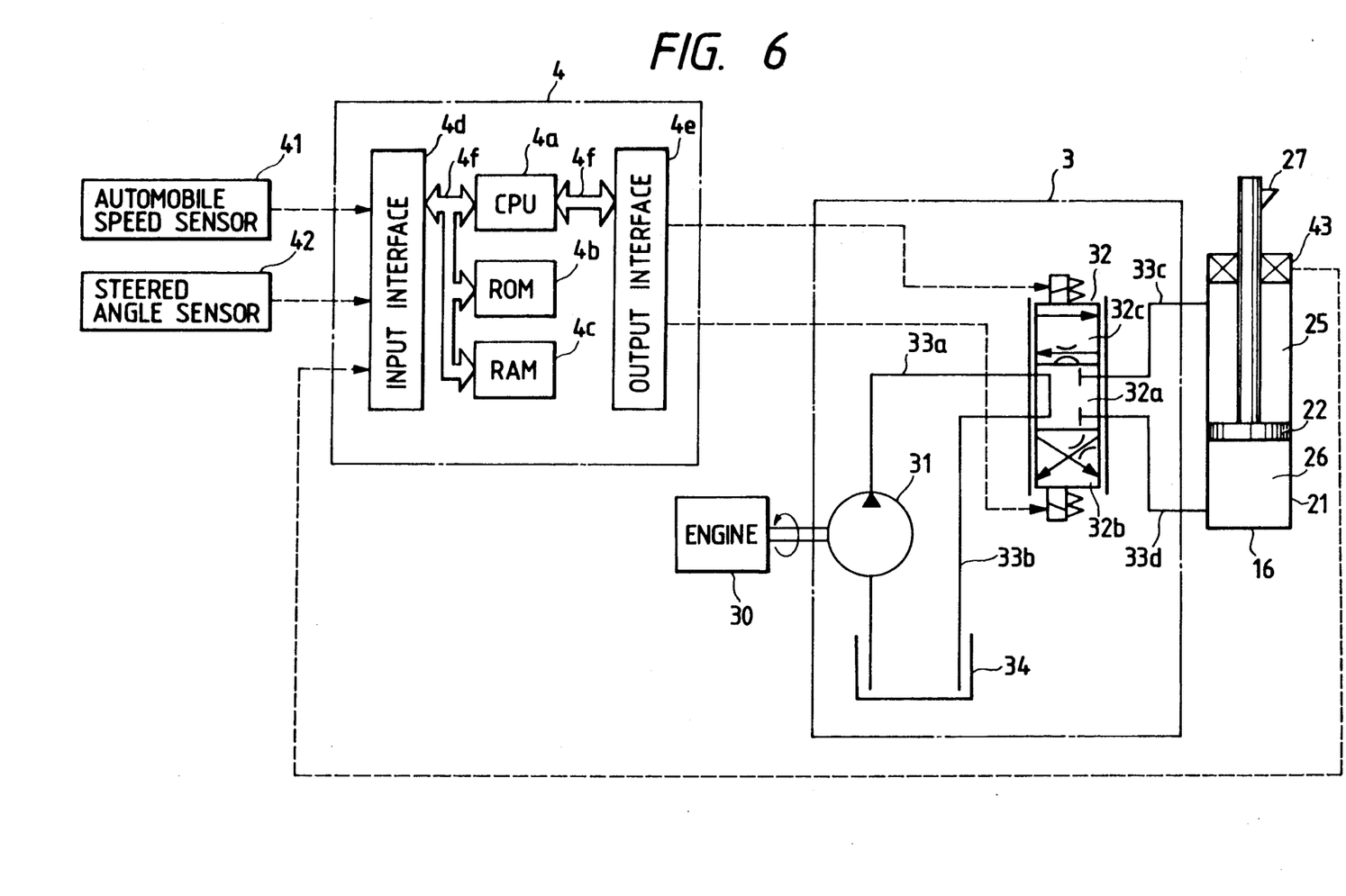
FIG. 6 is a circuit diagram of an electronic controller and a hydraulic pressure controller for controlling the cylinder assembly.

As shown in FIG. 6, the cylinder assembly 16 is operated by oil under pressure which is supplied from the hydraulic pressure controller 3 in response to a control signal from the electronic controller 4.

The hydraulic pressure controller 3 has a hydraulic pump 31 which is driven by an engine 30 through a power transmitting mechanism. The hydraulic pump 31 draws working oil from a reservoir tank 34 and supplies it to the cylinder assembly 16 through a pipe 33a, a directional control valve 32 in the form of a four-port three-position solenoid-controlled valve, and pipes 33c, 33d. The directional control valve 32 comprises one spool and two linear solenoids. In response to a control signal from the electronic controller 4, the linear solenoids are selectively energized to move the spool into a neutral position 32a in which the pump 31 is disconnected from the cylinder assembly 16, an expanded position 32b in which oil under pressure is supplied from the pump 31 into the lower chamber 26 of the cylinder assembly 16 and oil under pressure is discharged from the upper chamber 25 of the cylinder assembly 16 into the reservoir tank 34, a contracted position 32c in which oil under pressure is supplied into the upper chamber 25 and discharged from the lower chamber 26, and intermediate positions between the above three positions 32a, 32b, 32c.

As shown in FIG. 6, the electronic controller 4 comprises a microcomputer having an input interface 4d for receiving signals from the sensors 41, 42, 43, a central processing unit (CPU) 4a for processing the received signals and generating a control signal, a read-only memory (ROM) 4b for storing a control program and fixed data, a random-access memory (RAM) 4c for temporarily storing processed data and control conditions, an output interface 4e for applying the control signal to the directional control valve 32, and a common bus 4f interconnecting these elements 4a through 4e.

Figure 3:
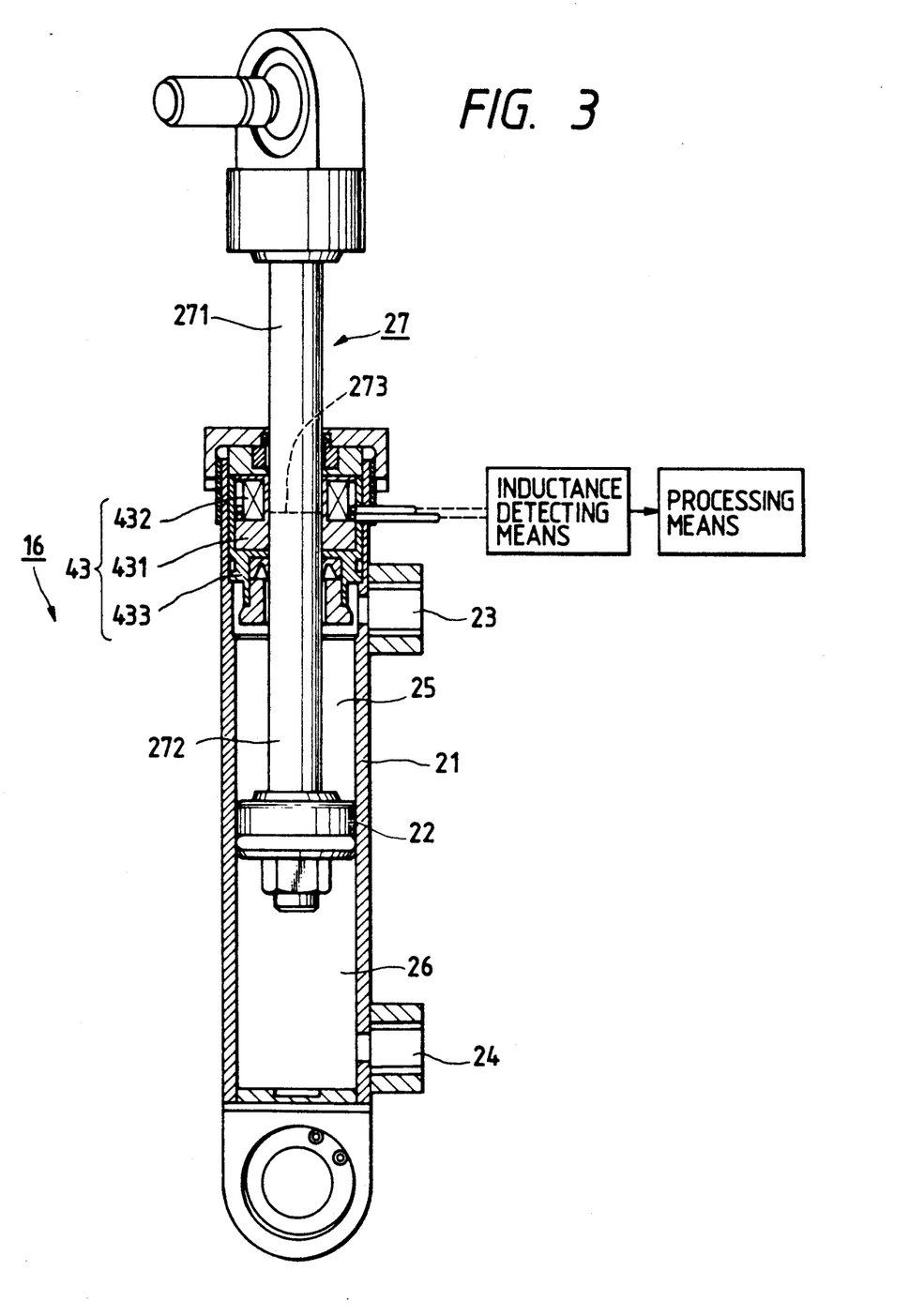
FIG. 3 is a cross-sectional view of the cylinder assembly.

As shown in FIG. 3, the position detector 43 comprises a coil 432 of an enameled wire wound around a bobbin 432 of synthetic resin, and a magnetic casing 433 made of S10C, for example, enclosing the bobbin 431. The magnetic casing 433 serves to concentrate magnetic fluxes generated by the coil 432 on the piston rod 27 without leakage.

Figure 4:
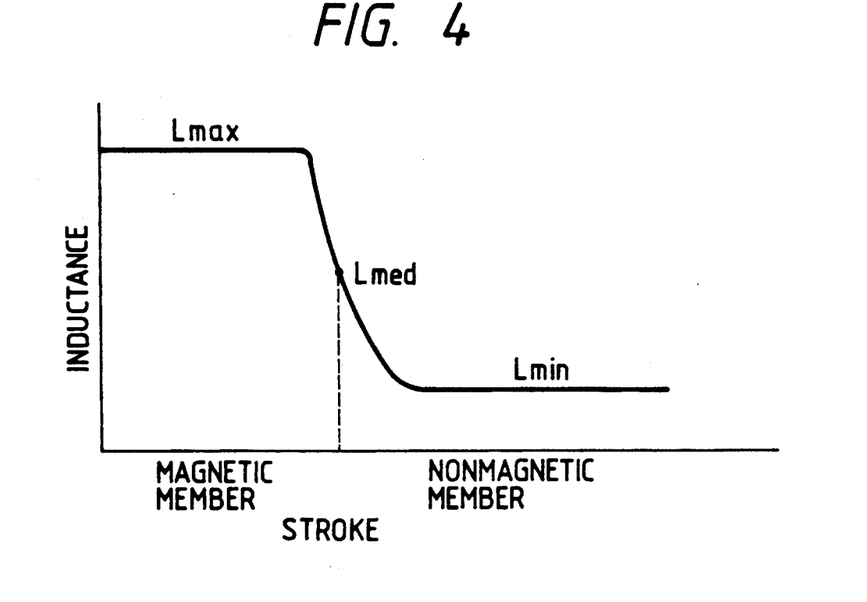
FIG. 4 is a graph showing how the inductance of a coil of a position detector varies with the stroke of the piston of the cylinder assembly.

When the nonmagnetic rod member 272 extends through the coil 432, the inductance of the coil 432 is low (has a minimum value Lmin as shown in FIG. 4) because the magnetic permeability of the nonmagnetic rod member 272 is very small. When the magnetic rod member 271 extends through the coil 432, the inductance of the coil 432 is high (has a maximum value Lmax) because the magnetic permeability of the magnetic rod member 271 is very large. When the boundary 273 is located within the coil 432, the inductance of the coil 432 is of a value Lmed intermediate between the minimum value Lmin and the maximum value Lmax. Therefore, the inductance of the coil 432 varies as shown in FIG. 4 when the piston rod 27 is axially moved through the coil 432.

Therefore, the piston rod 27 and the position detector 43 can function as a switch for indicating whether the piston 22 is on a contracted side from the intermediate position (as shown in FIG. 3) of the piston stroke or on an expanded side from the intermediate position, by comparing the inductance of the coil 432 with the threshold represented by the inductance value Lmed which corresponds to the intermediate position of the piston stroke. Since the inductance varies largely when the boundary 273 of the piston rod 27 through the coil 432, the intermediate position of the piston stroke can be detected more sharply if the width or axial length of the coil 432 is reduced.

The inductance of the coil 432, which represents the position of the piston 22 with respect to the cylinder 21, may also be detected by connecting a resistor in series to the coil 432 and measuring either the time constant of an output signal in response to a pulse voltage input signal, or a resonant frequency, or the difference in phase between a current and an AC voltage input signal. Alternatively, the position detector 43 may comprise a magnetic switch including a magnetic member embedded in the piston rod 27 which is made up of a nonmagnetic material, so that the magnetic switch can be triggered when the magnetic member reaches a certain position.

Figure 5:
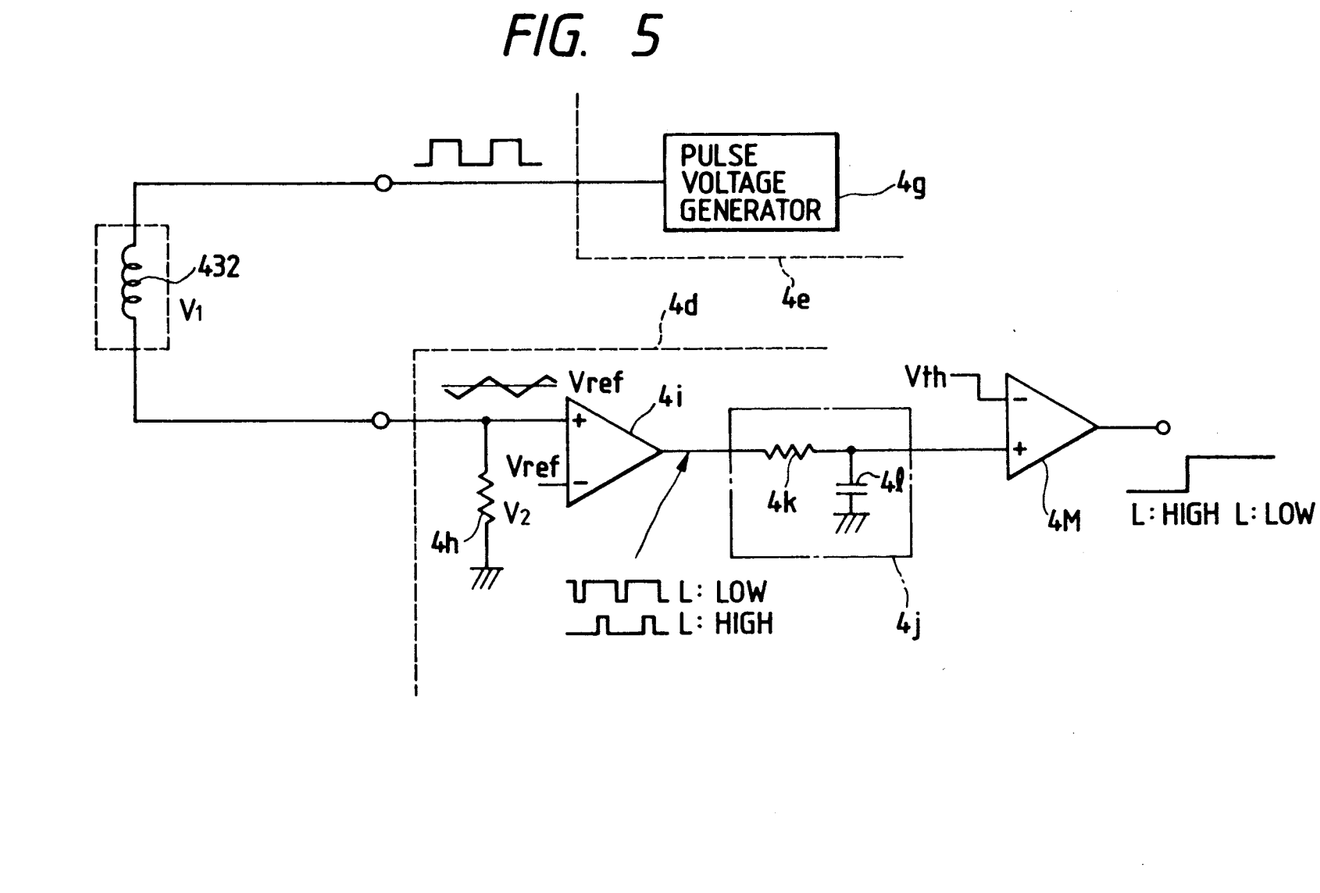
FIG. 5 is a circuit diagram of a circuit of the position detector for detecting the position of the piston.

Detection by the position detector 43 of the position of the piston 22 with respect to the cylinder 21 will be described in greater detail with reference to FIG. 5.

The output interference 4e of the electronic controller 4 includes a pulse voltage generator 4g which generates a periodic pulse voltage E that is applied to the coil 432 having an inductance L and a resistor 4h having a resistance R. If a current i flows through the coil 432 and the resistor 4h, then a voltage $v_1$ applied across the coil 432 is given by:

$$v_1 = L \frac{di}{dt}$$

Therefore, we obtain the following differential equation:

$$L \frac{di}{dt} + Ri = E$$

Solving the above equation for i, we get:

$$i = \frac{E}{R}(1 - e^{-(R/L)t})$$

Accordingly, the voltage $v_2$ applied across the resistor 4h is expressed as follows:

$$v_2 = Ri = E(1 - e^{-(R/L)t})$$

The voltage $v_2$ is then compared with a predetermined reference voltage Vref by a comparator 4i. If the voltage $v_2$ is higher than the reference voltage Vref, then the output signal of the comparator 4i is high. If the voltage $v_2$ is lower than the reference voltage Vref, then the output signal of the comparator 4i is low. The pulsed output from the comparator 4i is then converted into an average voltage by a pulse-duration-to-voltage converter 4j comprising a resistor 4k and a capacitor 4l. If the inductance L of the coil 432 is smaller, then the high level of the pulsed output from the comparator 4i has a greater proportion, and if the inductance L of the coil 432 is larger, then the low level of the pulsed output from the comparator 4i has a greater proportion. Therefore, the average voltage produced by the pulse-duration-to-voltage converter 4j corresponds to the inductance L of the coil 432. Then, the average voltage is compared by a comparator 4M with a threshold, voltage Vth which is selected to correspond to the intermediate position of the piston stroke. As a result, it can be detected from the output signal of the comparator 4M whether the piston stroke is on an expanded side or a contracted side.

Basic controlled operation of the hydraulic pressure controller 3 will be described below.

While the automobile is running straight ahead, the directional control valve 32 shown in FIG. 6 is held in the neutral position 32a. Oil under pressure discharged from the hydraulic pump 31 flows through the pipe 33a, the directional control valve 32, and the pipe 33b back into the reservoir tank 34. Since the pipes 33c, 33d are disconnected by the directional control valve 32, the upper and lower chambers 25, 26 of the cylinder assembly 16 are closed and the piston 22 is fixedly positioned in the cylinder 21. Therefore, the cylinder assembly 16 acts as a unitary rigid body as with the link rod 17. The stabilizer bar 13 allows the automobile to run stably due to the inherent torsional rigidity of the stabilizer bar 13.

When the automobile makes a turn, a target value for the stroke interval over which the cylinder assembly 16 is to be expanded or contracted is determined depending on either the automobile speed and the steered angle or a predetermined relationship, and then the hydraulic pressure controller 3 is operated to expand or contract the cylinder assembly 16 until its stroke interval reaches the target value. More specifically, to expand the cylinder assembly 16, the linear solenoid for shifting the directional control valve 32b into the expanded position 32b is energized. At this time, the port of the directional control valve 32 connected to the lower chamber 26 through the pipe 33d is fully opened to supply oil under pressure from the pump 31 through the pipe 33a, the valve 32, and the pipe 33d into the lower chamber 26. The port of the valve 32 which is connected to the upper chamber 25 through the pipe 33c increases its opening depending on the magnitude of the current supplied to the linear solenoid. Therefore, the rate of flow of oil discharged from the upper chamber 25 can be regulated by controlling the current supplied to the linear solenoid. That is, since the piston 22 is allowed to move toward the upper chamber 25 only when the oil is discharged from the upper chamber 25, the distance of movement of the piston 22, i.e., the stroke interval of the cylinder assembly 16, can be adjusted or controlled by controlling the current supplied to the linear solenoid. The relationship between the magnitude of the supplied current and the distance of movement of the piston 22 can be known in advance. Thus, the position of the piston 22 can be predicted by the electronic controller 4 from the magnitude of the current to be supplied to the linear solenoid and the time for which the current is to be supplied. The predicted position of the piston 22 is corrected by the position detector 43, and when it is thereafter determined that the predicted position of the piston 22 has reached the target position, the linear solenoid is de-energized. Then, the directional control valve 32 springs back to the neutral position 32a, and the upper and lower chambers 25, 26 of the cylinder assembly 16 are closed again, thereby holding the piston 22 in the target position. Since the hydraulic pressure controller 3 is a meter-out system, it can accurately control the oil flow in a wide range from a small flow rate to a large flow rate, and hence can reliably control the cylinder assembly 16.

The hydraulic pressure controller 3 may also be arranged as a meter-in system which controls the rate of oil as it flows into the cylinder assembly 16. However, if the pipes are made of rubber, the pipes are expanded and contracted when the oil is pressurized and released, and the position of the piston 22 is shifted an interval commensurate with the expanded or contracted volume of the space in the pipes. Consequently, positional control effected by the hydraulic pressure controller 3 is less accurate.

To contract the cylinder assembly 16, the linear solenoid which shifts the directional control valve 32 into the contracted position 32c is energized. The port of the directional control valve 32 connected to the upper chamber 25 through the pipe 33c is fully opened to supply oil under pressure from the pump 31 through the pipe 33a, the valve 32, and the pipe 33c into the upper chamber 25. The port of the valve 32 which is connected to the lower chamber 26 through the pipe 33d increases its opening as the current supplied to the linear solenoid increases. Therefore, the rate of flow of oil discharged from the lower chamber 26 can be regulated by controlling the current supplied to the linear solenoid. The position of the piston 22 is predicted, and when it is determined that the piston 22 has reached the target position, the linear solenoid is de-energized, and the piston 22 is fixed in the target position.

Figure 7:
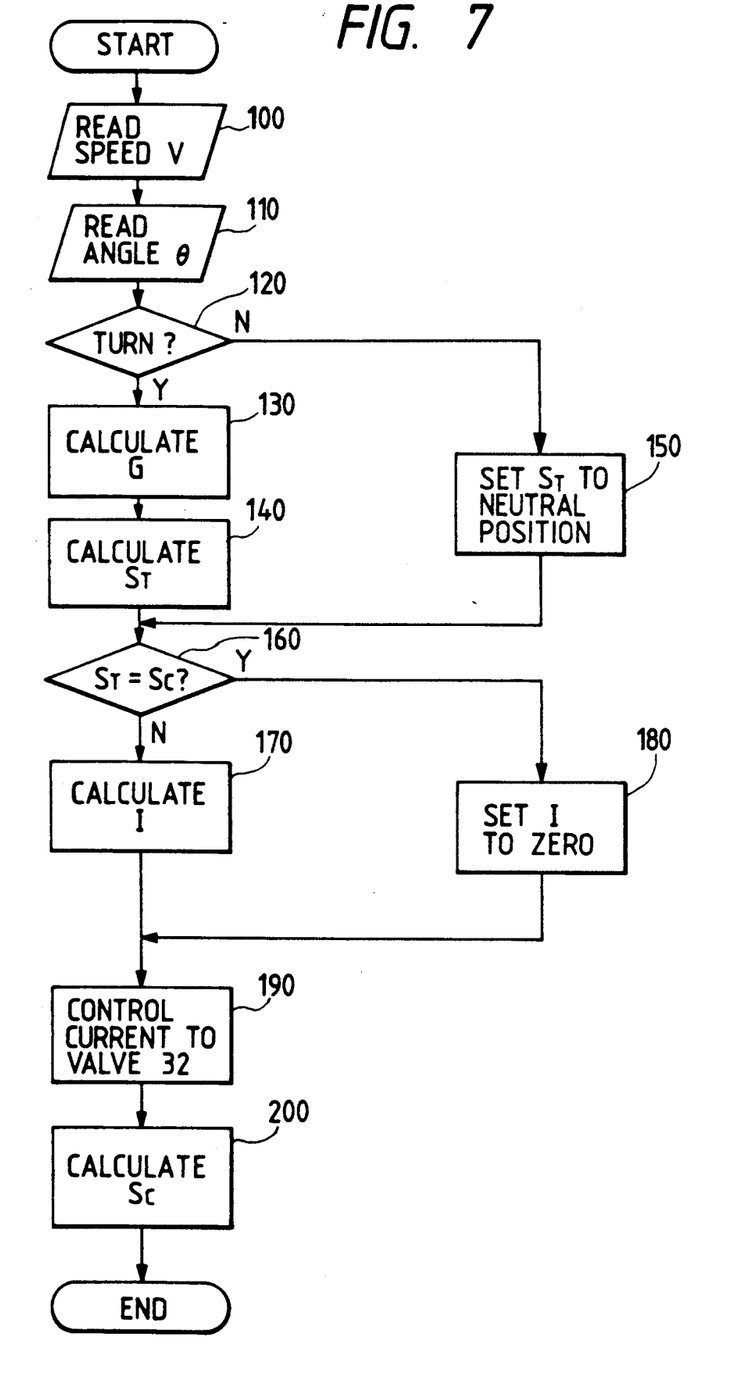
FIG. 7 is a flowchart of a control sequence of the electronic controller shown in FIG. 6.

A control sequence to be executed by the position control device for controlling the position of the piston 22, or the stroke interval of the cylinder assembly 16, will be described below with reference to FIG. 5. The processing of the flowchart of FIG. 5 is repeatedly executed at periodic cycles (each of 8 msec., for example) short enough as compared with the response time of the hydraulic pressure controller 16. Therefore, it is possible to correct a time delay or lag in the response of the mechanical system of the hydraulic pressure controller 3 which actuates the cylinder assembly 16.

An automobile speed V is read in a step 100, and a steered angle $\theta$ and a steered direction are read in a step 110. A next step 120 then determines whether the automobile is making a turn or running straight ahead, from a predetermined map based on the values thus read in the steps 100, 110. In the decision step 120, if the steered angle $\theta$ is within a steering dead zone, i.e., the steering force is absorbed by the play of the steering system or the twisting of the steered wheels and hence is not transmitted to turn the wheels, then it is determined that the automobile is running straight ahead. If the steering angle $\theta$ is outside of the dead zone, then it is determined that the automobile is making a turn. The dead zone is greater as the automobile speed is lower, and smaller as the automobile speed is higher. The dead zone is determined from a predetermined map.

If the automobile is making a turn, then control proceeds to a step 130 which calculates a lateral acceleration G ($=f(e, V)$) developed on the automobile. Thereafter, a step 140 calculates a target position $S_T$ for the piston 22 of the cylinder assembly 16, which is necessary to prevent the roll of the automobile body which would otherwise be caused by the lateral acceleration G. If the automobile is running straight, then the target position ST is set to the neutral position of the cylinder assembly 16 ($S_T=S_O+g(G)$, $S_O$: the neutral position) in a step 150.

A step 160 then compares the target position $S_T$ and a predicted position $S_C$ for the piston which has been calculated in the previous control cycle. If the target position $S_T$ and the predicted position $S_C$ are not equal to each other in the step 160, then control proceeds to a step 170. The step 170 calculates the value of an electric current I to be supplied to the linear solenoid of the directional control valve 32, depending on the magnitude and sign of the difference between the target position $S_T$ and the predicted position $S_C$. If the target position $S_T$ and the predicted position $S_C$ are equal to each other in the step 160, then the current I to be supplied to the linear solenoid is set to zero in a step 180. In a step 190, the current I calculated in the step 170 or 180 is supplied to the linear solenoid of the directional control valve 32.

Thereafter, a predicted position $S_C$ of the piston 22 of the cylinder assembly 16 is calculated from the value of the current I supplied to the linear solenoid of the valve 32 in a step 200. More specifically, based on a known relationship between the current I and the rate of flow of oil from the cylinder assembly 16, the rate of flow of oil from the cylinder assembly 16, i.e., the distance or interval of movement of the piston 22 per unit time (equal to the cycle time) is determined (since the bottom area of the cylinder assembly 16 is known, the distance of movement of the piston 22 is known from the flow rate that is the volume of oil discharged). By integrating the distances of movement of the piston 22 calculated in the respective cycles, the predicted position SC can be determined. During this process, the passage of the piston 22 across the neutral position can be known from the signal produced by the position detector 43, and the predicted position $S_C$ is corrected in a manner described later on each time the piston 22 moves past the neutral position. The current I to be supplied to the linear solenoid of the value 32 is also corrected depending on the magnitude of correction of the predicted position $S_C$.

The above procedure is repeated in the periodic cycles.

Specific arithmetic operations in the major steps of FIG. 7 will be described in greater detail below.

Figure 8:
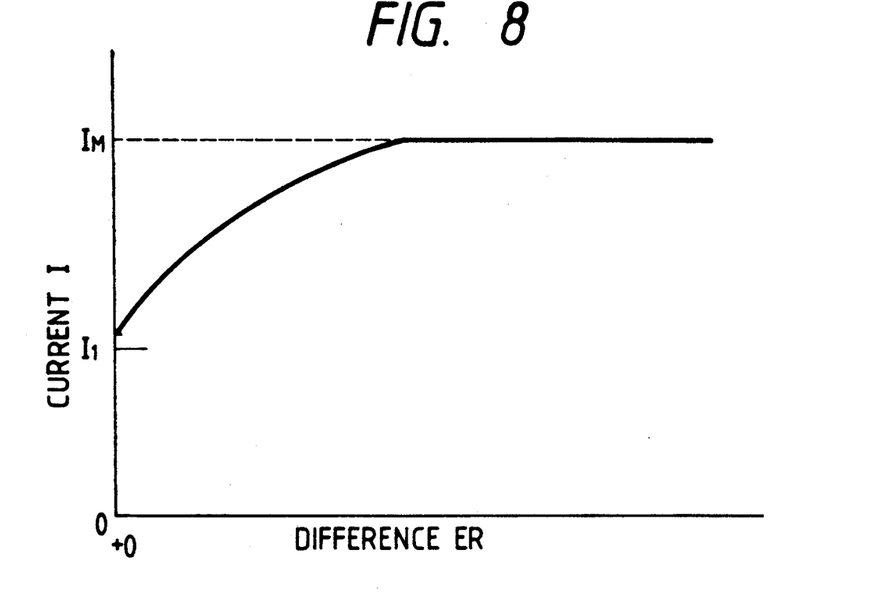
FIG. 8 is a graph showing the relationship between an electric current supplied to a control valve and the difference or error between target and predicted positions of the piston.

First, the calculation of the current I in the steps 160, 170, and 180 will be described. The difference or error ER between the target position $S_T$ calculated in the step 140 in the present cycle and the predicted position $S_C$ which has been calculated in the preceding cycle (8 msec. ago) and is predictive of the piston position in the present cycle is determined ($ER=S_T-S_C$). If the value of the difference ER is greater than a predetermined value (i.e., beyond the control dead zone), then it is determined from the sign of the difference ER whether the cylinder assembly 16 is to be expanded or contracted. More specifically, if the sign of the difference ER is positive, then because the actual position is presumed to be short of the target position $S_T$, it is necessary to expand the cylinder assembly 16. If the sign of the difference ER is negative, then it is necessary to contract the cylinder assembly 16. For the sake of simplicity, however, the position of the piston 22 is always expressed as being positive in the embodiment; the position of the piston 22 is minimum when the cylinder assembly 16 is most contracted, and maximum when the cylinder assembly 16 is most expanded. Then, the value of the current I required to eliminate the difference ER is determined from the magnitude (absolute value) of the difference ER. Such value of the current I can be determined from a map as shown in FIG. 8 in which the current I becomes larger as the difference ER goes greater. The value: $+0$ of the difference ER, i.e, the origin of the axis indicating the difference ER, represents the end of the control dead zone. The position of the piston 22, i.e., the stroke interval of the cylinder assembly 16, starts being controlled by the directional control valve 32 by a current $I_1$ supplied at the difference $ER = +0$. When the current I reaches a maximum $I_M$, the oil is discharged from the cylinder assembly value $I_M$, the oil is discharged from the cylinder assembly 16 at the maximum flow rate. When the value of the difference ER is in the control dead zone, it is presumed that the predicted position $S_C$ and the target position $S_T$ are equal to each other in the control dead zone. At this time, the current I to be supplied to the linear solenoid is set to zero, thus shifting the valve 32 to the neutral position 32a to hold the cylinder assembly 16 in the fixed position.

Figure 9:
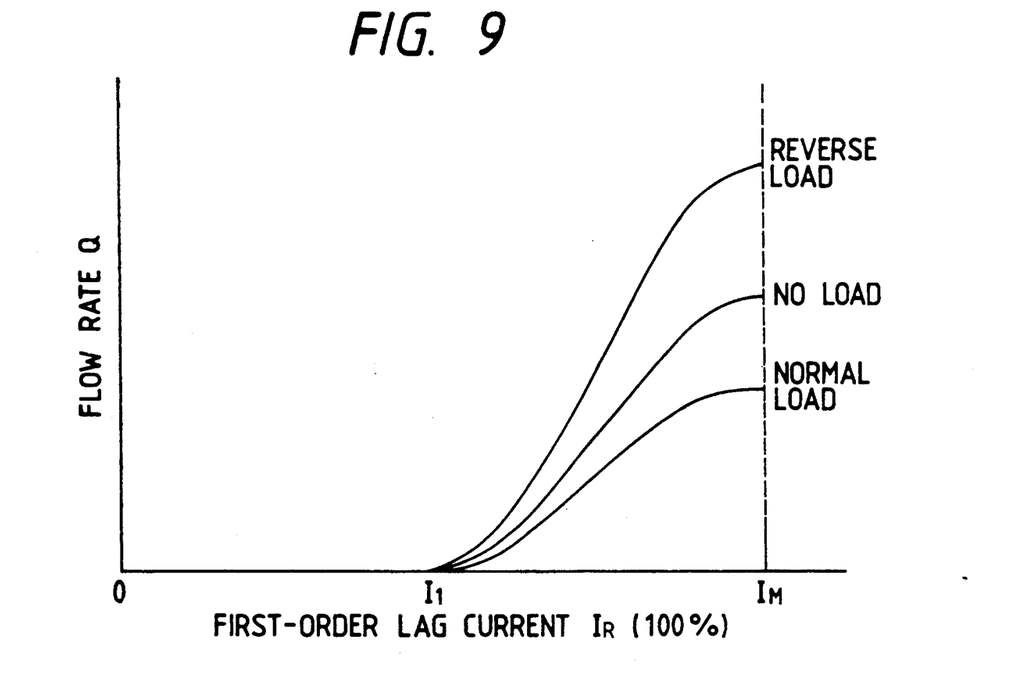
FIG. 9 is a graph showing the relationship between an electric current and a flow rate at different loads.

The predicted position $S_C$ of the piston 22 in the step 200 will be calculated as follows:

Normal flow rates Q of oil discharged from the cylinder assembly 16 at the time currents I are supplied the directional control valve 32 are measured. Such a measurement is carried out when the automobile is running straight and also making a turn. The measured flow rates Q will be used to correct variations or fluctuations of the flow rate Q of oil from the cylinder assembly 16 which are caused by a load shift in the cylinder assembly 16 due to the lateral acceleration G on the automobile during a turn. The measured data are plotted as a basic map (I - Q map) of currents I and flow rates Q. Such an I - Q map is illustrated in FIG. 9 by way of example. FIG. 9 shows a no-load curve I representing I - Q characteristics when the automobile runs straight ahead, a normal-load curve II representing I - Q characteristics when the cylinder assembly 16 is operated in a direction to suppress the roll of the automobile, and a reverse-load curve III representing I - Q characteristics when the cylinder assembly 16 is operated in a direction to increase the roll of the automobile.

The value of the current I supplied to the directional control valve 32 and the position of the spool of the valve 32 may be considered to be in one-to-one correspondence. However, since the valve 32 has a certain transient time lag or delay element, when the current I is supplied to one of the linear solenoids, the spool does not immediately move to the position corresponding to the supplied current I. In addition, even when the spool is moved, oil pressure is not immediately transmitted through the valve 32 to the cylinder assembly 16. These time lag elements are approximated by a first-order lag, and a first-order lag current IR is determined by regarding the current I supplied to the valve 32 in the step 190 as a first-order lag element (processing step 1).

Then, a load (Load) is calculated according to an equation given below from the distance between the predicted position $S_C$ determined in the preceding cycle and the neutral position $S_O$ of the cylinder assembly 16, and the direction in which the cylinder assembly 16 is expanded or contracted by the valve 32 operated by the supplied current in the step 190. The load (Load) means an external force acting against the expansion or contraction of the cylinder assembly 16. The load (Load) on the cylinder assembly 16 is generally proportional to the stroke interval from the neutral position.

$$\text{Load} = k_3 \cdot |S_C - S_O|$$

where $k_3$ is a constant. The constant $k_3$ is positive when the predicted position $S_C$ determined in the preceding cycle is on the expanded side of the cylinder assembly 16 and the cylinder assembly 16 is driven so as to be expanded in the present cycle, and is negative when the predicted position SC determined in the preceding cycle is on the expanded side and the cylinder assembly 16 is driven so as to be contracted in the present cycle. The constant $k_3$ is also positive when the predicted position $S_C$ determined in the preceding cycle is on the contracted side of the cylinder assembly 16 and the cylinder assembly 16 is driven so as to be contracted in the present cycle, and is also negative when the predicted position $S_C$ determined in the preceding cycle is on the contracted side and the cylinder assembly 16 is driven so as to be expanded in the present cycle Processing Step 2

From the map shown in FIG. 9 and based on the first-order lag current IR determined in the processing step 1 and the load (Load) determined in the processing step 2, a flow rate Q of oil discharged from the cylinder assembly 16 in one cycle by the present current control is determined. Since the inside diameter of the cylinder 21 and the diameter of the piston rod 27 are known, the stroke interval $\delta S_C$ of the cylinder assembly 16 in one cycle can be calculated from the flow rate Q thus determined. Therefore, the present predicted piston position or stroke interval $S_C(n)$ can be calculated from the previous position $S_C(n-1)$ and the stroke interval $\delta S_C$ of the cylinder assembly 16 in one cycle according to the following equation:

$$S_C(n) = S_C(n-1) + \delta S_C$$

Processing Step 3

Using the present predicted piston position $S_C(n)$ thus calculated, the value of a current I in a next cycle is determined as described above. According to the closed-loop control described above, however, if the stroke interval $\delta S_C$ in each cycle is subjected to an error due to a temperature change or other disturbance, then the predicted piston position $S_C$ contains an accumulation of such errors, and as a consequence tends to deviate from the actual piston position. The accumulated errors of the predicted position $S_C$ can be corrected by the signal from the position detector 43 which can detect when the piston 22 of the cylinder assembly 16 moves past the neutral position.

A procedure for correcting predicted position errors will be described below. As described above, the cylinder assembly 16 has a response delay when it is actuated by the directional control valve 32. Such a response delay is composed of various components which include, in addition to the time lag element referred to above, a responseless time in which the valve 32 does not respond at all even when it is supplied with a control start command from the electronic controller 4, and a responseless time in which the piston 22 of the cylinder assembly 16 does not respond at all even when the spool of the valve 32 is moved. The predicted position $S_C$ represents a piston position or stroke interval which will be reached when the cylinder assembly 16 is actuated on the assumption that the above responseless times are zero. Therefore, the predicted position $S_C$ indicates a position which is ahead of the actual position by an interval commensurate with the responseless times. For this reason, even when the position detector 43 detects that the actual position of the piston 22 of the cylinder assembly 16 becomes the neutral position $S_O$, the predicted position $S_C$ at that time cannot simply be regarded as the neutral position $S_O$.

Therefore, the correcting procedure, described below, will be executed which involves the predicted position $S_C$ and the detected signal from the position detector 43 which is representative of the neutral position. The correcting procedure will be described with reference to FIGS. 10 through 14 in which the piston 22 of the cylinder assembly 16 is moved from the contracted side toward the expanded side. However, the correcting procedure is also applicable to an instance in which the piston 22 is moved from the expanded side to the contracted side. The responseless times, defined above, which occur when the cylinder assembly 16 is operated, will collectively be referred to as a responseless time $T_L$.

Figure 14:
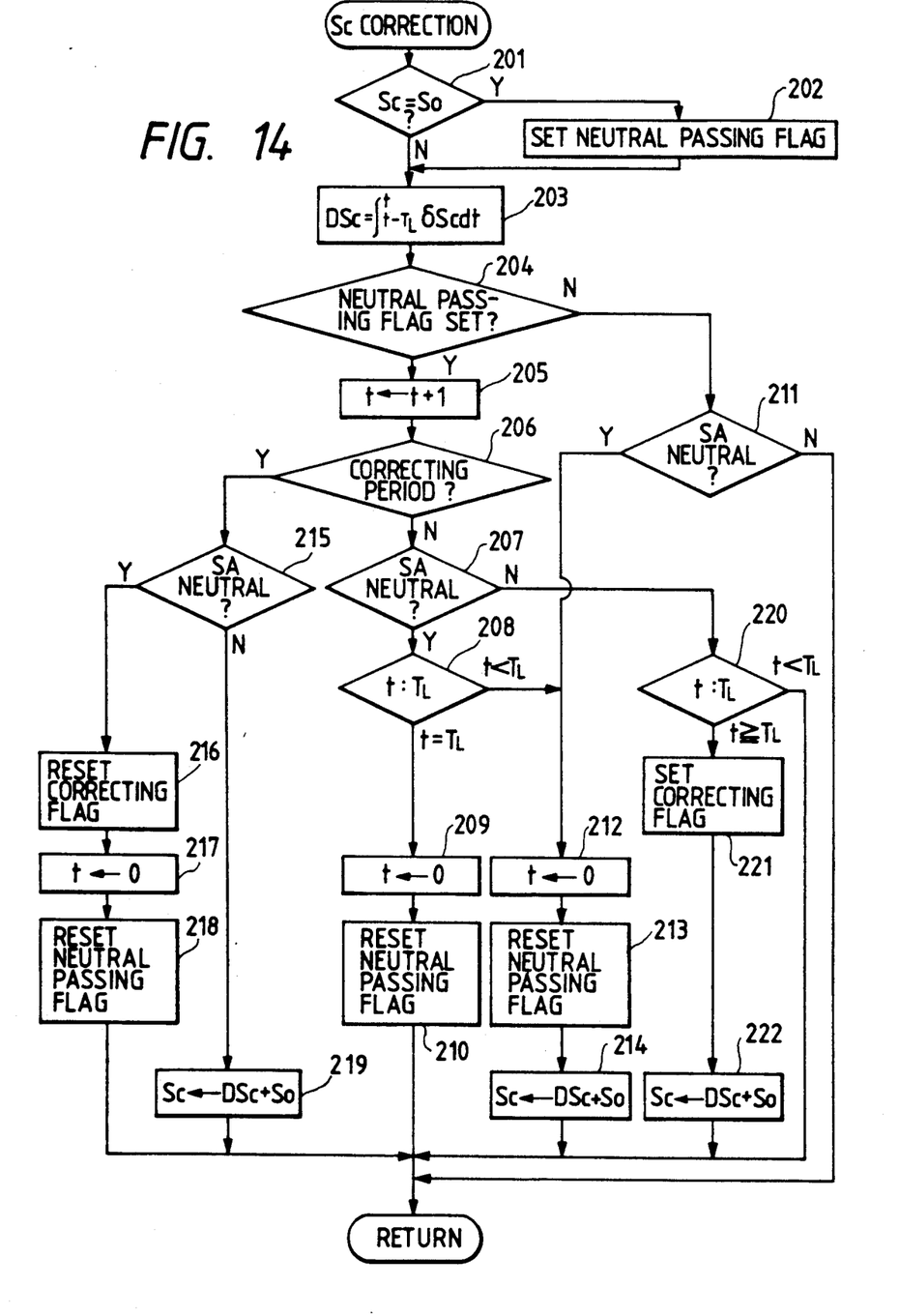
FIG. 14 is a flowchart of a sequence for correcting the predicted piston position.

As shown in FIG. 14, a step 201 determines whether the predicted position $S_C$ becomes the neutral position $S_O$ or not. If $S_C = S_O$, then control goes to a step 202 in which a flag indicating that the predicted position $S_C$ has passed the neutral position $S_O$ (hereinafter referred to as a "neutral passing flag") is set. Then, a step 203 integrates stroke intervals $\delta S_C$ in respective cycles from the present time up to a time before the responseless time $T_L$, and produces an integrated value $DS_C$.

Thereafter, a step 204 determines the neutral passing flag has been set or not. If set, then control proceeds to a step 205, and if not set, then control goes to a step 211. The step 211 determines whether an actual piston position $S_A$ is the neutral position or not. In the step 205, a counter t which counts a time that has elapsed after the predicted position $S_C$ has become the neutral position is incremented. Since the control cycle is repeated every 8 msec., adding "1" to the counter t means that 8 msec. have elapsed.

A step 206 determines whether a flag indicating that the predicted position $S_C$ is being corrected (hereinafter referred to as "correcting flag") has been set or not.

Figure 10:
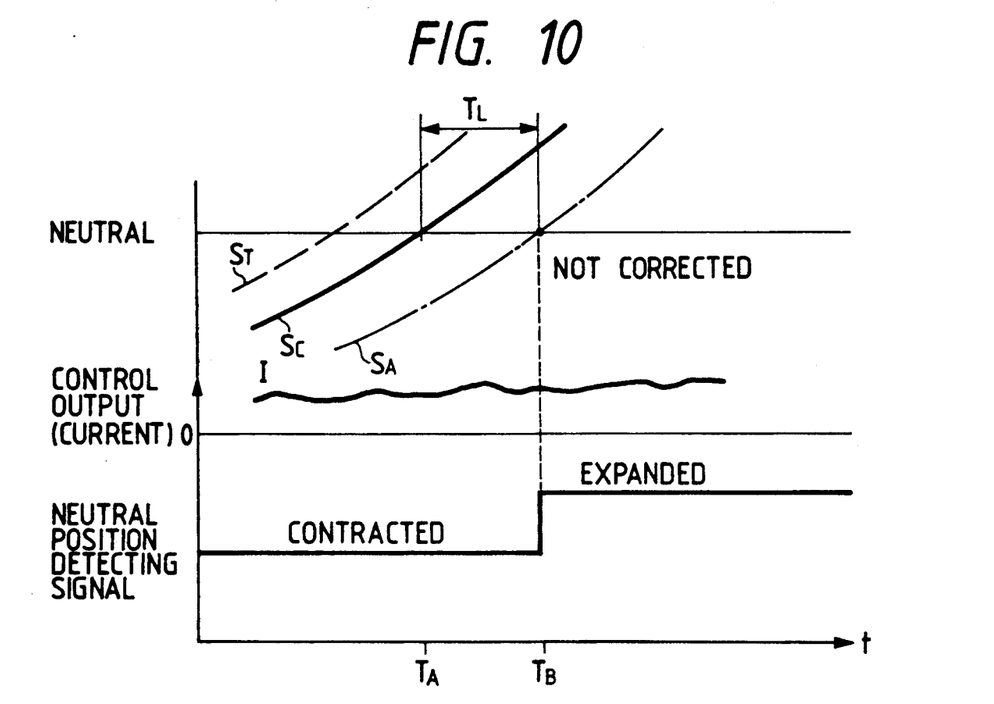
FIGS. 10 through 13 are graphs illustrating a process of correcting the predicted piston position.
Figure 11:
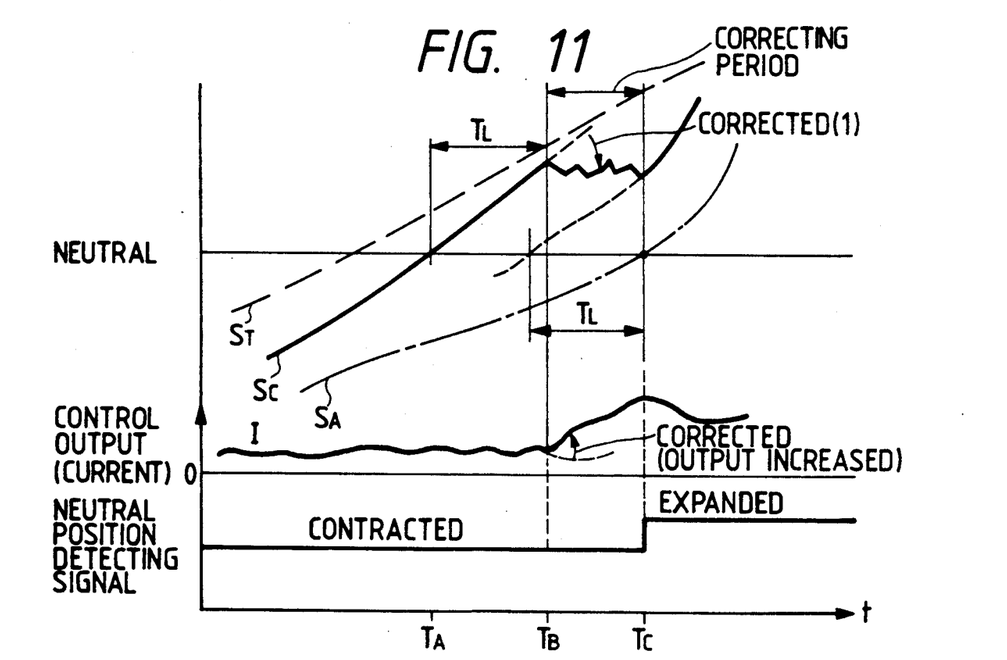

As shown in FIG. 10, if the neutral position detecting signal from the position detector 43 goes high (0→1) at a time $T_B$ which is the responseless time $T_L$ after a time $T_A$ when the predicted position $S_C$ becomes the neutral position, then the predicted position $S_C$ is accurate and does not need to be corrected. However, as shown in FIG. 11, if the actual piston position $S_A$ does not reach the neutral position even after elapse at the time $T_B$ of the responseless time $T_L$ after the time $T_A$, then the predicted position $S_C$ needs to be corrected. The interval between the time $T_B$ and the time $T_C$ is referred to as a "correcting time".

If the correcting flag is not set in the step 206, then control proceeds to a step 207 which determines the actual position $S_A$ has becomes the neutral position or not. If yes in the step 207, then control goes to a step 208 which compares the time counted by the counter t and the responseless time $T_L$. If the counter time t and the responseless time $T_L$ are equal to each other, then since the predicted position $S_C$ requires no correction, control goes to a step 209 in which the counter t is reset to 0, and then to a step 210 in which the neutral passing flag is reset, after which the routine is brought to an end.

As shown in FIG. 11, if the actual position $S_A$ does not reach the neutral position after elapse at the time $T_B$ of the responseless time $T_L$ after the time $T_A$ when the predicted position $S_C$ becomes the neutral position, then control goes from the step 207 to a step 220 which compares the counter time t and the responseless time $T_L$. If the counter time t is equal to or longer than the responseless time $T_L$, then the correcting flag is set in a step 221, and then the sum of the neutral position $S_O$ and the integrated value $DS_C$ calculated in the step 203 is set to the predicted position $S_C$, after which the present routine is finished. In the next cycle, therefore, control goes from the step 206 to a step 215. The step 215 determines whether the actual position $S_A$ becomes the neutral position or not. If the neutral position has not been reached yet, then control goes to a step 219 in which the sum of the neutral position $S_O$ and the integrated value $DS_C$ is set to the predicted position $S_C$. At the time the actual position $S_A$ becomes the neutral position because of the processing in the steps 219, 222, the predicted position $S_C$ is corrected into a position which is the responseless time $T_L$ ahead of the neutral position on the expanded side. If the actual position $S_A$ becomes the neutral position in the step 215, control goes from the step 215 to a step 216 in which the correcting flag which has been set in the step 221 is reset. The counter t is reset to 0 in a step 217, and then the neutral passing flag is reset in a step 218, whereupon the routine is finished. According to the above processing, the predicted position $S_C$ corresponds to the actual position $S_A$, but the difference between the predicted position $S_C$ and the target position $S_T$ is increased. Since the current I increases with the difference ER as shown in FIG. 8, however, the predicted position $S_C$ and the actual position $S_A$ are controlled to follow up the target position $S_T$ quickly.

Figure 12:
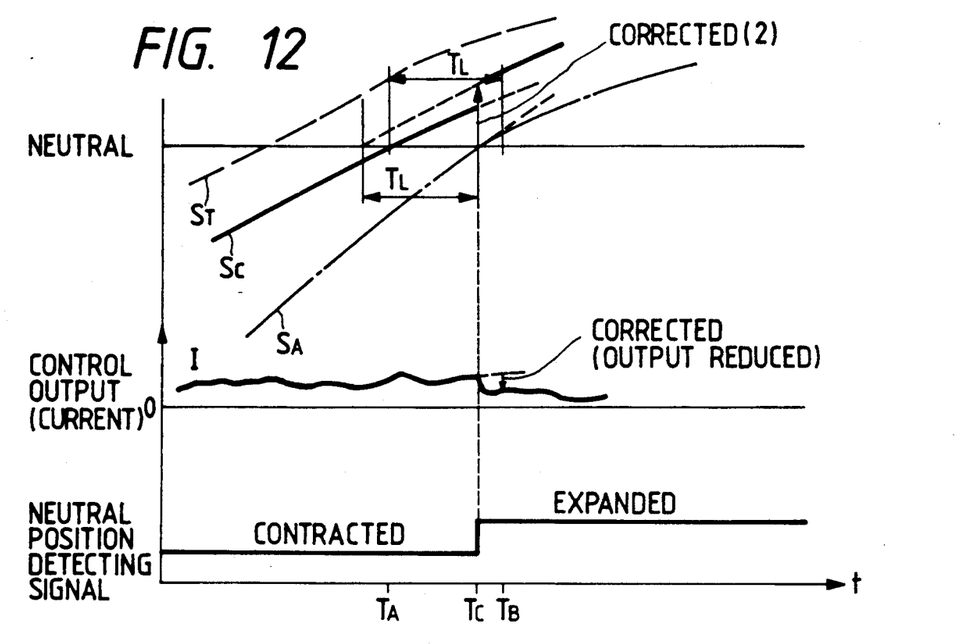
Figure 13:
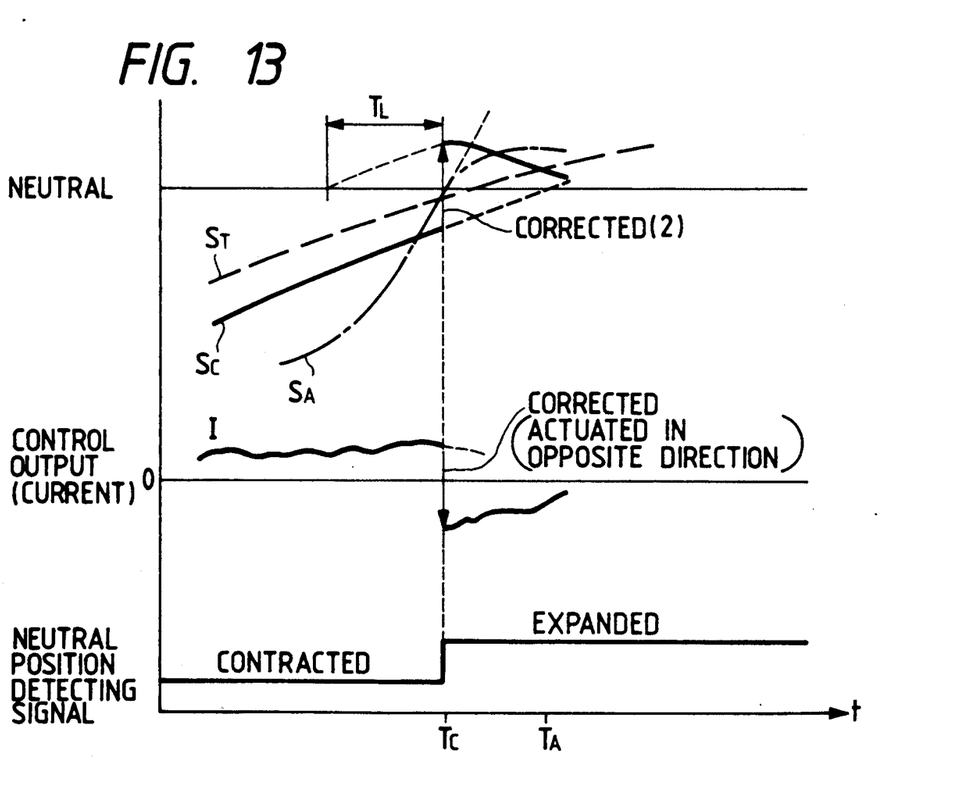

As shown in FIG. 12, if the actual position $S_A$ becomes the neutral position before elapse at the time $T_B$ of the responseless time $T_L$ after the time $T_A$ when the predicted position $S_C$ becomes the neutral position, control goes to the step 208. Since the counter time t is shorter than the responseless time $T_L$ in the step 208, control goes to a step 212 in which the counter t is reset to 0. Then, the neutral passing flag is reset in a step 213, and the sum of the neutral position $S_O$ and the integrated value $DS_C$ calculated in the step 203 is set to the predicted position $S_C$ in a step 214, after which the routine comes to an end. As shown in FIG. 13, if the actual position $S_A$ becomes the neutral position at the time $T_C$ before the predicted position $S_C$ reaches the neutral position, then control goes through the steps 204, 211, 212, 213, and 214. Thus, even if the actual position $S_A$ becomes the neutral position in advance of the time $T_A$ when the predicted position $S_C$ is presumed to reach the neutral position, the predicted position $S_C$ is corrected into a position which is the responseless time $T_L$ ahead of the neutral position $S_O$ on the expanded side, at the time $T_C$ when the actual position $S_A$ becomes the neutral position. Through this processing, the excessive displacement of the actual stroke on the expanded side with respect to the target position $S_T$ and the predicted position $S_C$ is reflected in the predicted position $S_C$. More specifically, since the difference ER between the target position $S_T$ and the predicted position $S_C$ is greatly reduced or its sign is inverted by the above processing, the current I is reduced or the current I is applied in a direction to actuate the cylinder assembly 16 in the opposite direction. Therefore, the predicted position $S_C$ and the actual position $S_A$ are controlled to follow up the target position $S_T$ reliably.

In the step 208, the time counted by the counter t is equal to or less than the responseless time $T_L$. This is because it is impossible for the counter time t to be longer than the responseless time $T_L$ in the comparison at the step 208. In the present embodiment, inasmuch as the predicted position $S_C$ for predicting a future position for the actual position $S_A$ is employed for position control, it can be recognized beforehand how the actual position $S_A$ will vary. If the predicted position $S_C$ is not appropriate, then the predicted position $S_C$ is corrected before the actual position $S_A$ reaches the predicted position $S_C$, so that stable positional control can be carried out with a quick response.

In this embodiment, the directional control valve 32 comprises a spool valve comprising one spool and two linear solenoids. However, the directional control valve 32 may be of any of various constructions insofar as it can selectively expand and contract the cylinder assembly 16 and electrically control the flow rate of oil discharged from the cylinder assembly 16. However, the output interface 4e of the electronic controller 4 and the I - Q map shown in FIG. 9 should be modified depending on the specifications of the directional control valve used.

If the solenoids of the directional control valve 32 are prevented from suffering temperature fluctuations by placing them in a thermostatic chamber, and the power supply voltage is stabilized, then the output interface 4e of the electronic controller 4 may comprise power transistors which are driven by the output port of the computer. At this time, the voltage applied to the solenoids is switched on and off at a duty ratio proportional to a current required to energize the solenoids, thereby controlling the average current to be supplied to the solenoids.

While the hydraulic pressure source comprises a pump driven by an engine in the illustrated embodiment, it may employ the pump of a power steering system on the automobile.

In the illustrated suspension system, the cylinder assembly is combined with the front wheel stabilizer only. However, cylinder assemblies may be combined with respective front and rear wheel stabilizers, and controlled in the same manner as described above. According to such a modification, two directional control valves may be provided for independently controlling the cylinder assemblies, or control oil pressures may be supplied from the output port of a single directional control valve to the cylinder assemblies.

The hydraulic pressure controller 3 corresponds to the adjusting means A shown in FIG. 1, the cylinder assembly 16 to the movable member B, the step 200 shown in FIG. 7 to the predicting means C, the control sequence shown in FIG. 14 to the correcting means E, and the electronic controller 4 to the control means F.

The cylinder assembly 16 with the position detector 43 may be employed as a shock absorber. In this case, the boundary 273 of the piston rod 27 is used as indicating the intermediate position of the piston stroke, and the coil 432 is located at a position spaced a distance from the intermediate position. By detecting how many times the piston rod boundary passes through the coil within a certain period of time, it can be determined whether the road on which the automobile is running is smooth or bumpy.

While the principles of the present invention are shown as being incorporated in a position control device for a cylinder assembly, the present invention is also applicable to an angular position control device for controlling the angular position of an angularly movable member.

Although a certain preferred embodiment has been shown and described, it should be understood that many changes and modifications may be made therein without departing from the scope of the appended claims.

What is claimed is:

1. A position control device for a cylinder assembly, comprising:
    adjusting means for adjusting the stroke position of the cylinder assembly in response to a control signal;
    predicting means for predicting the stroke position of the cylinder assembly based on said control signal;
    position detecting means for detecting when the cylinder assembly has actually reached a predetermined stroke position;
    correcting means for correcting the predicted stroke position of the cylinder assembly into said predetermined stroke position when it is detected by said position detecting means that the cylinder assembly has actually reached said predetermined stroke position; and
    control means for applying said control signal to said adjusting means so that the predicted stroke position as corrected by said correcting means will be equalized to a target stroke position for the cylinder assembly.

2. A position control device according to claim 1, wherein the cylinder assembly has a piston, and said predetermined stroke position is a substantially intermediate position of the stroke of said piston.

3. A position control device according to claim 1, wherein the cylinder assembly has a piston, said adjusting means comprising means for moving said piston with a fluid under pressure, and a solenoid-operated valve for controlling the flow rate of said fluid depending on the magnitude of a current supplied to the solenoid-operated valve, said predicting means including means for calculating the stroke position of said piston based on the magnitude of said current and a period of time during which said current is supplied to the solenoid-operated valve.

4. A position control device according to claim 3, wherein said solenoid-operated valve has a port which is fully openable when said current is supplied, for supplying the fluid under pressure to said cylinder assembly, and a port whose opening is variable depending on the magnitude of said current, for allowing the fluid under pressure to be discharged from said cylinder assembly.

5. A position control device according to claim 1, wherein the cylinder assembly has a piston, and said predicting means comprises means for predicting, as the stroke position of said piston, the actual stroke position of the piston after an elapse of a predetermined period of time.

6. A position control device according to claim 5, wherein said correcting means comprises means for correcting the predicted stroke position into a stroke position which is reached by said actual stroke position after the elapse of said predetermined period of time, when it is detected by said position detecting means that the actual stroke position of said piston has reached said predetermined stroke position.

7. An automotive suspension system comprising:
a cylinder assembly disposed between the body of an automobile and a road wheel thereof and having a piston positionally controllable by a fluid under pressure;
condition detecting means for detecting a condition of the automobile;
processing means for calculating a target position of the piston based on the detected condition of the automobile; and
position control means for controlling said cylinder assembly so that the position of said piston will be equalized to said target position, said control means comprising:
adjusting means for adjusting the position of said piston under the pressure of the fluid in response to a control signal;
predicting means for predicting the position of said piston based on said control signal;
position detecting means for detecting when said piston has actually reached a predetermined position;
correcting means for correcting the predicted position of said piston into said predetermined position when it is detected that said piston has actually reached said predetermined position; and
control means for applying said control signal to said adjusting means so that the predicted position as corrected by said correcting means will be equalized to a target position for said piston.

8. An automotive suspension system according to claim 7, wherein said condition detecting means includes turn detecting means for detecting a turning condition of the automobile during a turn thereof, further comprising:
predicted-position correcting means for correcting the predicted position depending on the detected turning condition of the automobile thereby to take into account a change in the flow rate of said fluid which is caused by a lateral acceleration on the automobile during the turn.

9. An automotive suspension system according to claim 7, wherein said predetermined position is a substantially intermediate position of the stroke of said piston.

10. An automotive suspension system according to claim 7, wherein said adjusting means comprises a solenoid-controlled valve for controlling the flow rate of said fluid depending on the magnitude of a current supplied to the solenoid-operated valve, said predicting means including means for calculating the position of said piston based on the magnitude of said current and a period of time during which said current is supplied to the solenoid-operated valve.

11. An automotive suspension system according to claim 10, wherein said solenoid-operated valve has a port which is fully openable when said current is supplied, for supplying the fluid under pressure to said cylinder assembly, and a port whose opening is variable depending on the magnitude of said current, for allowing the fluid under pressure to be discharged from said cylinder assembly.

12. An automotive suspension system according to claim 7, wherein said control means comprises means for generating said control signal based on the difference between said predicted position and said target position, such that said piston is moved at a higher speed as said difference is larger.

13. An automotive suspension system according to claim 7, wherein said predicting means comprises means for predicting, as the position of said movable member, the actual position of said piston after elapse of a predetermined period of time.

14. An automotive suspension system according to claim 13, wherein said correcting means comprises means for correcting the predicted position into a position which is reached by said actual position after elapse of said predetermined period of time, when it is detected by said position detecting means that the actual position of said piston has reached said predetermined position.

15. A position detector comprising:
a cylinder;
a piston slidably disposed in said cylinder;
a piston rod movable with said piston and having first and second portions having different magnetic permeabilities;
a hollow coil disposed around said piston rod, said first and second portions of the piston rod being movable through said hollow co 1 when said piston is slidably moved in said cylinder;
means for applying an electric signal which varies with time;
detecting means for detecting a change in the inductance of said coil; and
processing means for calculating the position of said piston based on the detected change in the inductance of said coil.

16. A position detector according to claim 15, wherein said first and second portions comprise respective members joined to each other.

* * * * *